United States Patent
Bafra et al.

(10) Patent No.: US 8,780,939 B2
(45) Date of Patent: Jul. 15, 2014

(54) SYSTEM AND METHOD FOR TRANSMITTING AUDIO DATA OVER SERIAL LINK

(75) Inventors: Arda Kamil Bafra, Istanbul (TR); Levent Yakay, Istanbul (TR); Mustafa Ertugrul Oner, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 556 days.

(21) Appl. No.: 12/611,911

(22) Filed: Nov. 3, 2009

(65) Prior Publication Data
US 2011/0103404 A1 May 5, 2011

(51) Int. Cl.
*H04L 12/08* (2006.01)
(52) U.S. Cl.
USPC .................. 370/474; 370/476; 370/395.64
(58) Field of Classification Search
None
See application file for complete search history.

(56) References Cited

U.S. PATENT DOCUMENTS

| | | | | |
|---|---|---|---|---|
| 5,923,384 | A * | 7/1999 | Enomoto et al. | 348/705 |
| 7,782,805 | B1 * | 8/2010 | Belhadj et al. | 370/300 |
| 2002/0163598 | A1 * | 11/2002 | Pasqualino | 348/725 |
| 2004/0080671 | A1 * | 4/2004 | Siemens et al. | 348/473 |
| 2007/0286234 | A1 * | 12/2007 | Gutman et al. | 370/468 |
| 2007/0286600 | A1 * | 12/2007 | Guo et al. | 398/43 |

\* cited by examiner

*Primary Examiner* — Kibrom T Hailu
*Assistant Examiner* — Zewdu A Beyen
(74) *Attorney, Agent, or Firm* — North Weber & Baugh LLP

(57) ABSTRACT

System and method for transmitting video and audio data words via a serial data link. A transmitting device includes a first module for generating an audio data frame comprising an audio data word and a frame separation code; and a second module for generating high speed data frames each comprising at least a portion of a video data word and only a portion of the audio data frame, and for transmitting the high speed data frames via the serial data link. A receiving device includes a first module for forming the video data word from one or more high speed data frames, and a second module for forming the audio data frame from portions of high speed data frames. The second module may extract the audio data word from the audio data frame, and generate an audio clock based on a rate in which audio data words are received.

24 Claims, 10 Drawing Sheets

SERIAL CHANNEL DATA FRAME

LOW SPEED DATA FRAME

LOW SPEED DATA FRAME
(EXAMPLE)

| LS FRAME<br>SEPARATION CODE | LS FRAME<br>START CODE | LS FRAME DATA WITH SEPARATION CODE<br>COLLISION PROTECTION | LS FRAME<br>END CODE |
|---|---|---|---|
| 00000000 | 1 | 10100101 1000000100 111000101101110 | 1 |

STUFFED BIT

SERIAL CHANNEL DATA FRAME

AUDIO DATA FRAME

SYSTEM AND METHOD FOR TRANSMITTING AUDIO DATA OVER SERIAL LINK

FIELD OF THE INVENTION

This invention relates generally to data communication systems, and in particular, to a system and method for transferring audio data over a serial data link.

BACKGROUND OF THE INVENTION

In many applications, high speed data may be transferred from a source to a sink substantially simultaneously with the transfer of low speed data. For example, in video applications, video data (e.g., relatively high speed data) may be transferred from a multimedia source (e.g., a camera) to a multimedia sink (e.g., a display). Often, in such video applications, audio data (e.g., relatively low speed data) may also be transferred from the multimedia source (e.g., camera microphone) to the multimedia sink (e.g., speakers). In such multimedia systems, separate dedicated physical mediums are typically used to transfer the video and audio data, respectively. For example, in the case of audio, such multimedia system transfers audio data over a Media Oriented Systems Transport (MOST) bus.

In some applications, the transmission of video and audio data over separate dedicated cables may be acceptable. However, in other applications, such as in automotive and aircraft systems, it is generally desirable to reduce the physical space and weight of cables used for transferring data because of generally stringent space and weight requirements in such systems. Thus, in such systems, it would be desirable to have a single medium through which both video and audio may be transmitted simultaneously. Additionally, it would also be desirable to transmit the data using a simple and inexpensive physical medium, such as an unshielded twisted wire pair.

SUMMARY OF THE INVENTION

An aspect of the invention relates to a transmitting device for transmitting high speed and low speed data words via a serial data link. The transmitting device comprises a first module adapted to generate a low speed data frame comprising the low speed data word and a frame separation code; and a second module adapted to: (1) generate a high speed data frame comprising at least a portion of the high speed data word and only a portion of the low speed data frame; and (2) serially transmit the high speed data frame via the serial data link. In another aspect, the high speed data frame may include an entire high speed data word. In yet another aspect, the high speed data frame may include only a single bit of the low speed data frame.

In another aspect of the transmitting device invention, the high speed data word comprises a video data word, and the low speed data frame comprises an audio data word. In another aspect, the low speed data frame further comprises a stereo-channel select for the corresponding audio data word. In yet another aspect, the audio data word and stereo-channel select are compliant with I²S protocol.

In yet another aspect of the transmitting device invention, the low speed data frame further comprises a frame start code to indicate a start of the low speed data word and a frame end code to indicate an end of the low speed data word. In another aspect, the first module of the transmitting device is adapted to encode the low speed data word so that the separation code does not appear in the encoded low speed data word.

In still another aspect of the transmitting device invention, the transmitting device further comprises a low speed data serializer adapted to receive the low speed data word in parallel format at a low speed data rate, and convert the low speed data word into serial format. In another aspect, the first module is adapted to generate the low speed data frame at a high speed data rate from the serialized low speed data word at the low speed data rate. In still another aspect, the second module comprises a high speed data serializer adapted to: (1) receive the high speed data word in parallel format at the high speed data rate; (2) receive the portion of the low speed data frame from the first module at the high speed data rate; (3) time multiplex the high speed data word with the portion of the low speed data frame to generate the high speed data frame; and (4) serially transmit the high speed data frame via the serial data link at the high speed data rate.

Another aspect of the invention relates to a receiving device for processing a plurality of high speed data frames received via a serial data link. The receiving device comprises a first module adapted to: (1) serially receive the high speed data frames via the serial data link, (2) form a high speed data word from one or more high speed data frames, and (3) output portions of low speed data frames from respective high speed data frames; and a second module to form the low speed data frame from respective portions of the high speed data frames, wherein the low speed data frame comprises a frame separation code and a low speed data word.

In another aspect of the receiving device invention, the portions of the low speed data frame each comprises a single bit of the low speed data frame. In yet another aspect, the high speed data word comprises a video data word, and the low speed data frame comprises an audio data word. In yet another aspect, the low speed data frame comprises a stereo-channel select associated with the audio data word. In still another aspect, the second module is adapted to generate an audio clock signal based on a rate in which audio data words are received and/or the potential overflow or underflow condition of a FIFO temporarily storing the audio data words. In an additional aspect, the audio data word, stereo-channel select, and audio clock signal are compliant with I²S protocol.

In another aspect of the receiving device invention, the low speed data frame further includes a frame start code to indicate a start of the low speed data word and a frame end code to indicate an end of the low speed data word. In yet another aspect, the second module is adapted to decode the low speed data word such that one or more instances of the frame separation code appears in the decoded low speed data word.

In another aspect of the receiving device invention, the first module comprises a high speed deserializer adapted to convert the high speed data frame in the serial format to a parallel format. In yet another aspect, the second module is adapted to convert the low speed data word received in serial format from the first module into a parallel format. In still another aspect, the second module is adapted to convert the low speed data frame in a high speed clock domain to a low speed clock domain. In an additional aspect, the second module is adapted to generate a clock signal based on a rate in which low speed data words are received.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1A:
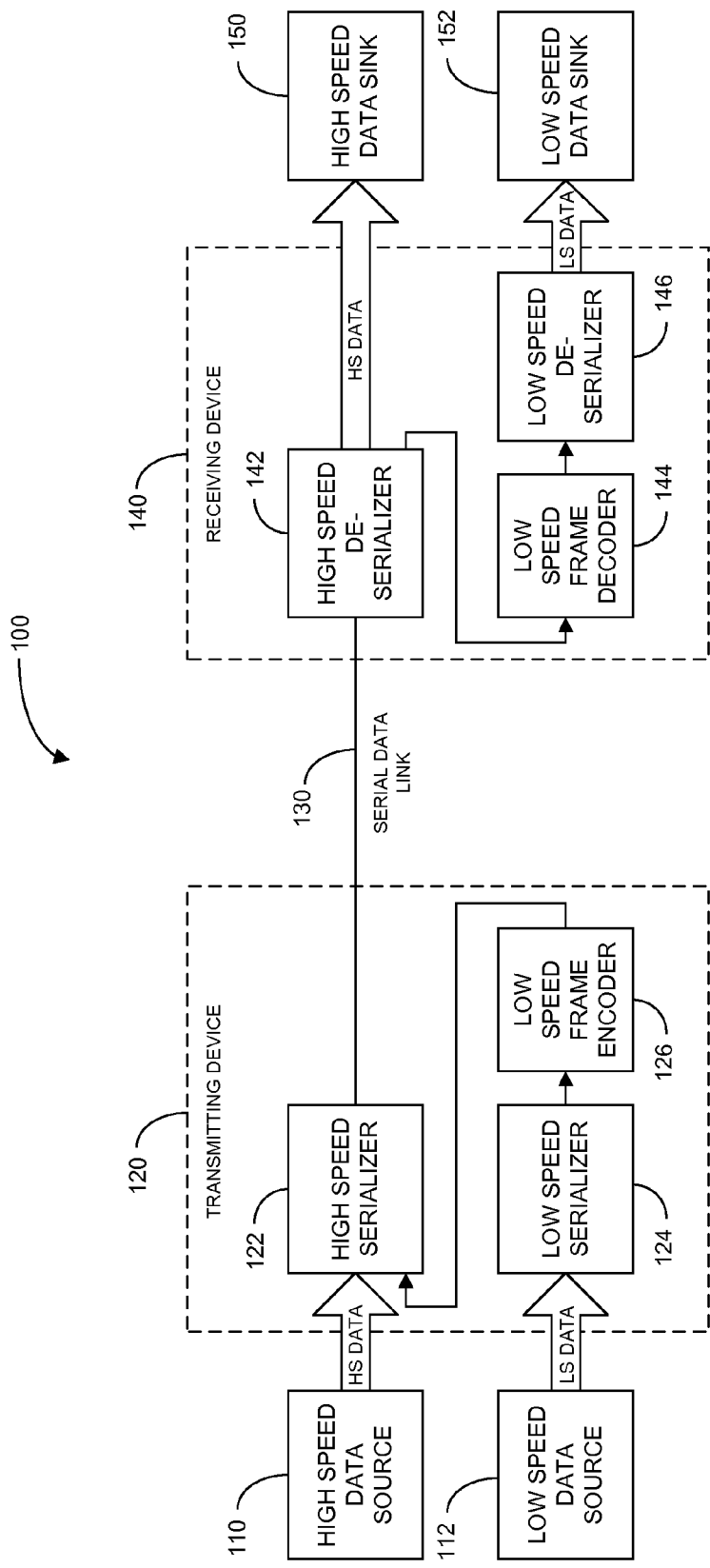
FIG. 1A illustrates a block diagram of an exemplary communication system in accordance with an embodiment of the invention.

FIG. 1A illustrates a block diagram of an exemplary communication system 100 in accordance with an embodiment of the invention. In summary, the communication system 100 is configured to simultaneously transmit high speed and low speed data from a transmitting device to a receiving device by way of a serial data link. The communication system 100 is further configured to transmit the simultaneous high speed and low speed data in accordance with a serial channel data frame comprised of a plurality of the high speed data (e.g., a whole word of the high speed data) and fewer low speed data (e.g., a partial or one-bit of a word of the low speed data). Additionally, the communication system 100 is configured to encode the low speed data in such a manner that the word length and word boundary may be discerned at a receiving end.

In particular, the communication system 100 comprises a transmitting device 120, a receiving device 140, and a serial data link 130 coupling the transmitting device 120 to the receiving device 140. The transmitting device 120 receives parallel high speed data from a high speed data source 110, and parallel low speed data from a low speed data source 112.

For the purpose of this disclosure, high speed data means that it is transmitted at a rate greater than the rate in which the low speed data is transmitted. The receiving device 140 provides parallel high speed data to a high speed data sink 150, and parallel low speed data to a low speed data sink 152.

More specifically, the transmitting device 120 is configured to receive the parallel high speed and low speed data, convert the parallel data into serial data, encode the low speed data in a manner that word boundaries are discernable at the receiving side, combine the high speed and encoded low speed data in a particular manner for transmission via the serial data link 130, and transmit the combined data via the link.

In this regards, the transmitting device 120 comprises a low speed serializer 124, a low speed frame encoder 126, and a high speed serializer 122. The low speed serializer 124 receives the parallel low speed data from the low speed data source and converts the parallel data into serial data. The low speed frame encoder 126 encodes the serial data to form a frame of the serial low speed data. As discussed in more detail below, the low speed data frame may include a frame separation code, a frame start code, a word of the low speed data, and a frame end code. It shall be understood that the cascading of serializer 124 and encoder 126 need not be in this order. For example, the encoder 126 could encode the parallel data from the low speed data source 112, and then the serializer 124 could serialize the encoded parallel data. Alternatively, the functionality of the serializer 124 and encoder 126 could be combined into an integrated low speed data processing unit. The high speed serializer 122 converts the parallel high speed data from the high speed data source 110 into serial data, and time-multiplexes the high speed serial data with the encoded low speed serial data to form a serial channel data frame for transmission to the receiving device 140 via the serial data link 130.

The receiving device 140 is configured to receive the serial channel data frame, separate the high speed data from the low speed data, convert the high speed data from serial to parallel data, provide the parallel high speed data to the high speed data sink 150, decode the low speed data frame to extract the serial low speed data, convert the low speed data from serial to parallel data, and provide the parallel low speed data to the low speed data sink 152.

In this regards, the receiving device 140 comprises a high speed deserializer 142, a low speed frame decoder 144, and a low speed deserializer 146. The high speed deserializer 142 receives the serial channel data frame from the serial data link 130, and converts it into parallel data. The high speed deserializer 142 provides the high speed data portion of the parallel data to the high speed data sink 150, and the low speed data portion (e.g., 1 bit) to the low speed frame decoder 144. The low speed frame decoder 144 accumulates the low speed data portion until a low speed data frame is formed. Then, the decoder 144 extracts the low speed data word from the low speed data frame. The low speed deserializer 146 converts the decoded serial data into parallel data, and provides the parallel low speed data to the low speed data sink 152. It shall be understood that the cascading of decoder 144 and serializer 146 need not be in this order. For example, the low speed deserializer 146 could convert the serial low speed data from the high speed deserializer 142 into a parallel low speed data frame, and then the decoder extracts the low speed data word from the parallel data frame. Alternatively, the functionality of the decoder 144 and serializer 146 could be combined into an integrated low speed data processing unit.

Figure 1B:
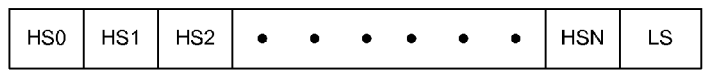
FIG. 1B illustrates a signal diagram of an exemplary serial channel data frame in accordance with another embodiment of the invention.

FIG. 1B illustrates a signal diagram of an exemplary serial channel data frame in accordance with another embodiment of the invention. As previously discussed, the serial channel data frame is serially transmitted from the transmitting device 120 to the receiving device 140 by way of the serial data link 130. The serial channel data frame may include an entire word of the high speed data HS0 to HSN. It shall be understood that the serial channel data frame may include more or less of an entire word of the high speed data. Additionally, the serial channel data frame may include only a portion of a word of the low speed data. In this example, the serial channel data frame includes a single bit LS of the low speed data. It shall be understood that the serial channel data frame may include more than one bit of the low speed data.

Figure 1C:
FIG. 1C illustrates a signal diagram of an exemplary low speed data frame in accordance with another embodiment of the invention.

FIG. 1C illustrates a signal diagram of an exemplary low speed data frame in accordance with another embodiment of the invention. As previously discussed, the low speed data frame is configured so that a low speed data word may be discerned by the receiving device 140 device. In this regards, the low speed data frame includes a frame separation code, a frame start code, frame data with separation code collision protection encoding, and a frame end code. The frame separation code is used to delineate or mark the boundary of a frame. The frame start code marks the start of the frame data payload. The frame data includes a low speed data word, which is encoded so as to prevent the frame separation code to appear in the frame data. This is done so that the receiving end does not confuse frame data with the frame separation code. Finally, the frame end code marks the end of the frame. Accordingly, the receiving device 140 is able to differentiate sequential low speed data frames by detecting the frame separation code. Additionally, the receiving device 140 is able to extract the frame data because it is positioned between the frame start and end codes.

Figure 1D:
FIG. 1D illustrates a signal diagram of a specific example of a low speed data frame in accordance with another embodiment of the invention.

FIG. 1D illustrates a signal diagram of a specific example of a low speed data frame in accordance with another embodiment of the invention. In this example, the frame separation code is given by a defined number N (e.g., eight (8)) of consecutive zeros. It shall be understood that the frame separation code could be N number of ones, or some other defined pattern of ones and zeros. In this example, the frame start code is a single-bit logic one. It shall be understood that the frame start code could be a single-bit logic zero, or a multi-bit defined pattern. Similarly, in this example, the frame end code is a single bit logic one. It shall be understood that the frame end code could be a single-bit logic zero, or a multi-bit defined pattern. In this example, the frame data includes a 32-bit low speed data word. It shall be understood that the frame data may include a low speed data word of any length.

Also, in this example, the frame data has been encoded to prevent a frame separation code collision. This is done so that receiving device 140 does not confuse frame data for the frame separation code. As noted within the dashed rectangle, the 32-bit low speed data word included eight (8) consecutive zeros, e.g., the same as the frame separation code. Accordingly, to prevent a frame separation code collision in the frame data, the encoder 126 has stuffed that portion of the frame data with an extra logic one bit as noted. This eliminates the frame separation code from appearing in the frame data. Also note that the bit stuffing resulted in 33 bits in the frame data payload. In this example, the bit stuffing algorithm being used is that if the separation code includes N zeros, then a bit stuffing occurs after M consecutive zeros, wherein M<N. In this case, the separation code has eight (8) zeros (e.g., N=8), and the bit stuffing occurs after the sixth consecutive zeros (e.g., M=6). It shall be understood that other algorithms may be implemented to prevent the frame separation code from appearing in the frame data.

Figure 2:
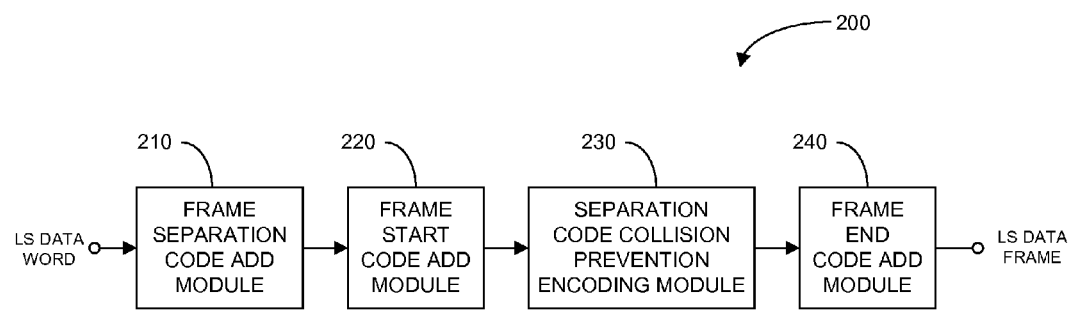
FIG. 2 illustrates a block diagram of an exemplary low speed data frame encoder in accordance with another embodiment of the invention.

FIG. 2 illustrates a block diagram of an exemplary low speed data frame encoder 200 in accordance with another embodiment of the invention. The low speed data frame encoder 200 may be a more detailed implementation of the encoder 126 previously discussed. The low speed data encoder 200 receives a low speed data word, and processes the word to generate a low speed data frame. In particular, the low speed data encoder 200 comprises a frame separation code add module 210, a frame start code add module 220, a separation code collision prevention encoding module 230, and a frame end code add module 240. The frame separation code add module 210 adds a frame separation code to the low speed data word. The frame start code add module 220 adds a frame start code to the low speed data word. The separation code collision prevention encoding module 230 analyzes the low speed data word to determine if there are any one or more frame separation codes appearing in the data word, and if there are, encodes the data word to prevent the appearance of the frame separation code therein. Finally, the frame end code add module 240 adds a frame end code to the low speed data word. In this example, the frame separation code, the frame start code, the low speed data word which may be encoded, and the frame end code form the low speed data frame.

Figure 3:
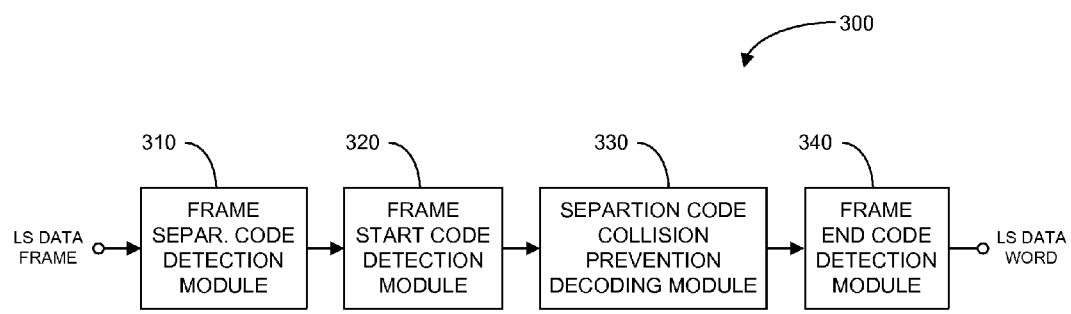
FIG. 3 illustrates a block diagram of an exemplary low speed data frame decoder in accordance with another embodiment of the invention.

FIG. 3 illustrates a block diagram of an exemplary low speed data decoder 300 in accordance with another embodiment of the invention. The low speed data encoder 300 may be a more detailed implementation of the decoder 144 previously discussed. The low speed data decoder 300 receives a low speed data frame, and processes the frame to generate or recover the low speed data word. In particular, the low speed data decoder 300 comprises a frame separation code detection module 310, a frame start code detection module 320, a separation code collision prevention decoding module 330, and a frame end code detection module 340. The frame separation code detection module 310 detects the frame separation code in the received low speed data frame for frame separation purposes. The frame start code detection module 320 detects the frame start code in order to identify what follows as frame data. The separation code collision prevention decoding module 330 analyzes the frame data to determine if there are any one or more encoded data for frame separation codes collision prevention purposes, and if there are, decodes the frame data to extract the low speed data word. Finally, the frame end code detection module 340 detects the frame end code to complete and confirm the successful processing of the low speed data frame.

Figure 4A:
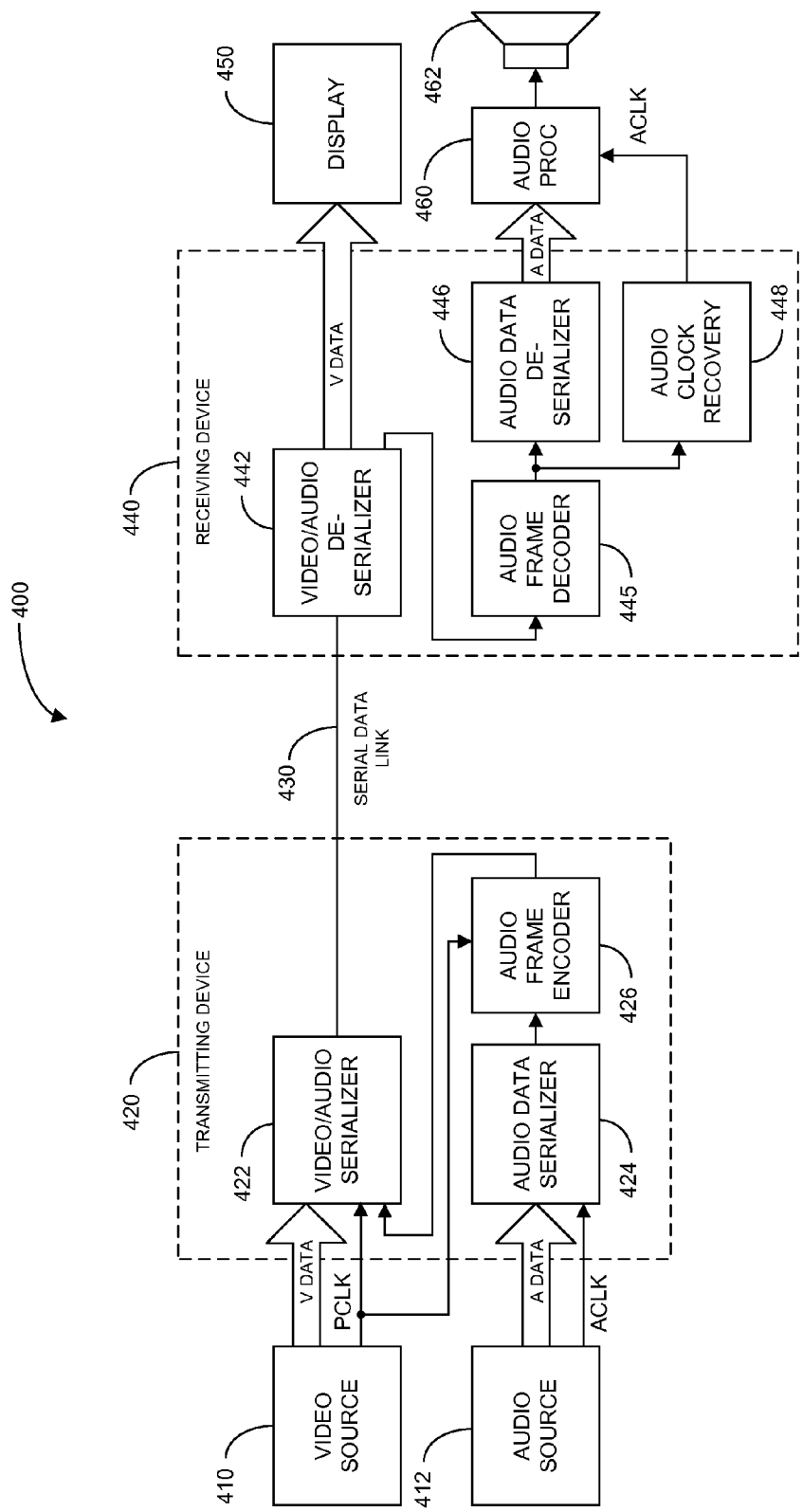
FIG. 4A illustrates a block diagram of another exemplary communication system in accordance with another embodiment of the invention.

FIG. 4A illustrates a block diagram of another exemplary communication system 400 in accordance with another embodiment of the invention. In summary, the communication system 400 is similar to communication system 100 with the exception that the high speed data is defined as video data and the low speed data is defined audio data. In summary, the communication system 400 is configured to simultaneously transmit video and audio data from a transmitting device to a receiving device by way of a serial data link. The communication system 400 is further configured to transmit the simultaneous video and audio data in accordance with a serial channel data frame comprised of a plurality of video data (e.g., a whole word of video data) and fewer audio data (e.g., a partial or one-bit of an audio data word). Additionally, the communication system 400 is configured to encode the audio data in such a manner that the audio word length and word boundary may be discerned by the receiving device.

In particular, the communication system 400 comprises a transmitting device 420, a receiving device 440, and a serial data link 430 coupling the transmitting device 420 to the receiving device 440. The transmitting device 420 receives parallel video data and a video clock PCLK from a video source 410 (e.g., a camera, DVD player, laptop, etc.). The transmitting device 420 also receives parallel audio data and an audio clock ACLK from an audio source 412 (e.g., a camera, DVD player, laptop, etc.). The receiving device 440 provides the parallel video data to a display 450. The receiving device 440 receives and the parallel audio data and generates or recovers the audio clock ACLK, and provides the audio data and audio clock to an audio processor 460 and associated speaker 462.

More specifically, the transmitting device 420 is configured to receive the parallel video and audio data and corresponding clocks PCLK and ACLK, convert the parallel data into serial data using the corresponding clocks PCLK and ACLK, encode the audio data in a manner that word boundaries are discernable by the receiving device 440, combine the video and audio data in a particular manner for transmission via the serial data link 430, and transmit the combined data via the link.

In this regards, the transmitting device 420 comprises an audio data serializer 424, an audio frame encoder 426, and a video/audio serializer 422. The audio data serializer 424 receives parallel audio data and the audio clock ACLK from the audio source 412, and converts the parallel audio data into serial audio data using the clock ACLK. The audio frame encoder 426 encodes the serial audio data to form an audio data frame using the video clock PCLK. Thus, the serializer 424 and encoder 426 perform three functions: (1) convert the audio data from parallel to serial data; (2) encode the serial audio data to form an audio data frame; and (3) convert the audio data from the audio clock ACLK domain to the video clock PCLK domain. It shall be understood that the cascading of the audio data serializer 424 and encoder 426 need not be in this order. For example, the encoder 426 could encode the parallel audio data from the audio source 412, and then the serializer 424 could serialize the encoded parallel data. Alternatively, the functionality of the serializer 424 and encoder 426 could be combined into an integrated audio data processing unit.

The video/audio serializer 422 serializes the parallel video data from the video source 410 and the data from the audio data frame to form a serial channel data frame using the video clock PCLK. The video/audio serializer 422 then serially transmits the audio data frame to the receiving device 440 via the serial data link 430 at a rate dictated by the video clock PCLK.

The receiving device 440, in turn, is configured to receive the serial channel data frame, separate the video data from the audio data frame, convert the video data into parallel video data, provide the parallel video data to the display 450 for image production, decode the audio data frame to extract the serial audio data, generate or recover the audio clock ACLK, convert the audio data from serial to parallel data, and provide the parallel audio data and recovered audio clock ACLK to the audio processor 460 and associated speaker 462 for sound production.

In this regards, the receiving device 440 comprises a video/audio deserializer 442, an audio frame decoder 445, an audio data deserializer 446, and an audio clock recovery module 448. The video/audio deserializer 442 receives the serial channel data frame from the serial data link 430, and converts it into parallel data. The video/audio deserializer 442 provides the video data portion of the parallel data to the display 450, and the audio data frame portion (e.g., 1 bit) to the audio frame decoder 445. The audio frame decoder 445 accumulates the received data to form the audio data frame, and extracts the audio data word from the audio data frame. The audio data deserializer 446 converts the decoded serial audio data into parallel audio data, and provides the parallel audio data to the audio processor 460 and associated speaker 462. The audio clock recovery module 448 determines the rate in which the audio data words are received, and generates the audio clock ACLK based on this rate. The audio clock recovery module 448 then provides the recovered audio clock ACLK to the audio processor 460 and associated speaker 462.

It shall be understood that the cascading of decoder 445 and serializer 446 need not be in this order. For example, the audio data deserializer 446 could convert the serial audio data from the video/audio deserializer 442 into parallel data, and then the decoder 445 extracts the audio data word from the decoded parallel data. In such a case, the audio clock recovery module 448 would still be coupled to the output of the audio frame decoder 445 to ascertain the rate in which audio data words are arriving for audio clock generation purposes. Alternatively, the functionality of the decoder 445, serializer 446, and/or audio clock recovery module 448 could be combined into an integrated audio data processing unit.

Figure 4B:
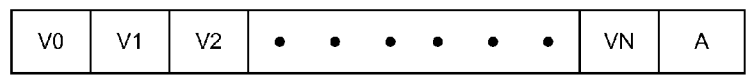
FIG. 4B illustrates a signal diagram of another exemplary serial channel data frame in accordance with another embodiment of the invention.

FIG. 4B illustrates a signal diagram of an exemplary serial channel data frame in accordance with another embodiment of the invention. As previously discussed, the serial channel data frame is serially transmitted from the transmitting device 420 to the receiving device 440 by way of the serial data link 430. The serial channel data frame may include an entire word of the video data V0 to VN. It shall be understood that the serial channel data frame may include more or less of an entire word of the video data. Additionally, the serial channel data frame may include only a portion of the audio data frame. In this example, the serial channel data frame includes a single bit "A" of the audio data frame. It shall be understood that the serial channel data frame may include more than one bit of the audio data frame.

Figure 4C:
FIG. 4C illustrates a signal diagram of an exemplary audio data frame in accordance with another embodiment of the invention.

FIG. 4C illustrates a signal diagram of an exemplary audio data frame in accordance with another embodiment of the invention. As previously discussed, the audio data frame is configured so that an audio data word may be discerned by the receiving device 420. In this regards, the audio data frame includes a frame separation code, a frame start code, frame audio data with separation code collision prevention encoding, and a frame end code. The frame separation code is used to delineate or mark the boundary of a frame. The frame start code marks the start of the frame audio data. The frame data includes an audio data word ADAT and L-R stereo channel selection data AWS, which is encoded so as to prevent the frame separation code to appear in the frame data. This is done so that the receiving device 440 does not confuse frame data for the frame separation code. Finally, the frame end code marks the end of the frame. Accordingly, the receiving device 440 is able to differentiate sequential audio data frames by detecting the frame separation code. Additionally, the receiving device 440 is able to extract the frame data because it is positioned between the frame start and end codes.

Figure 5:
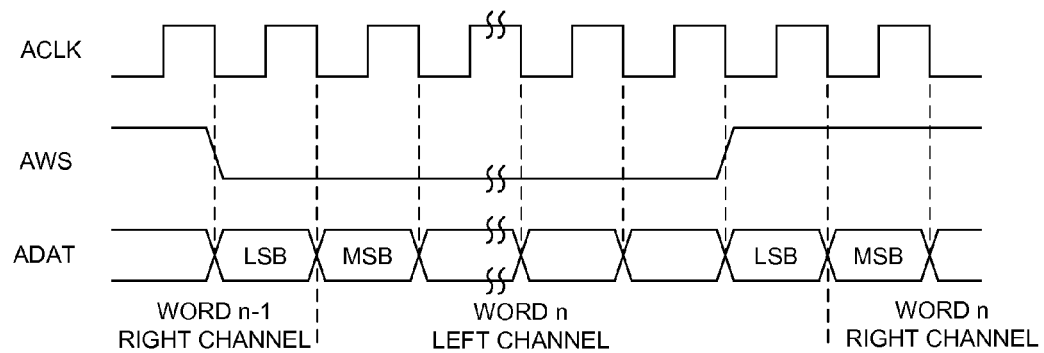
FIG. 5 illustrates a timing diagram of an exemplary $I^2S$ audio data protocol in accordance with another embodiment of the invention.

FIG. 5 illustrates a timing diagram of an exemplary I$^2$S audio data protocol in accordance with another embodiment of the invention. The communication systems previously discussed may be configured to process audio data in I$^2$S protocol for transmission from a transmitting device to a receiving device by way of the serial data link, as previously discussed. According to the I$^2$S protocol, an audio signal may have three (3) distinct components: (1) an audio bit clock (ACLK), (2) an audio word select (AWS), and (3) audio data (ADAT).

The audio bit clock ACLK is used for clocking out or in bits of the audio data and to set the rate in which the audio data is transmitted and received. As an example, the rate of the audio data may be set to between 8 KHz to 192 KHz. The rising edge of the audio bit clock ACLK is used for clocking out or in bits of the audio word select AWS, and bits of the audio data ADAT. The audio word select AWS is for specifying the left- or right-stereo channel. For instance, in this example, the audio word select AWS being at a high logic level indicates that the corresponding audio word is for the right-stereo channel, and a low logic level indicates that the corresponding word is for the left-stereo channel. As noted, the bits of an audio word are transmitted sequentially from the most significant bit (MSB) to the least significant bit (LSB).

Figure 6A:
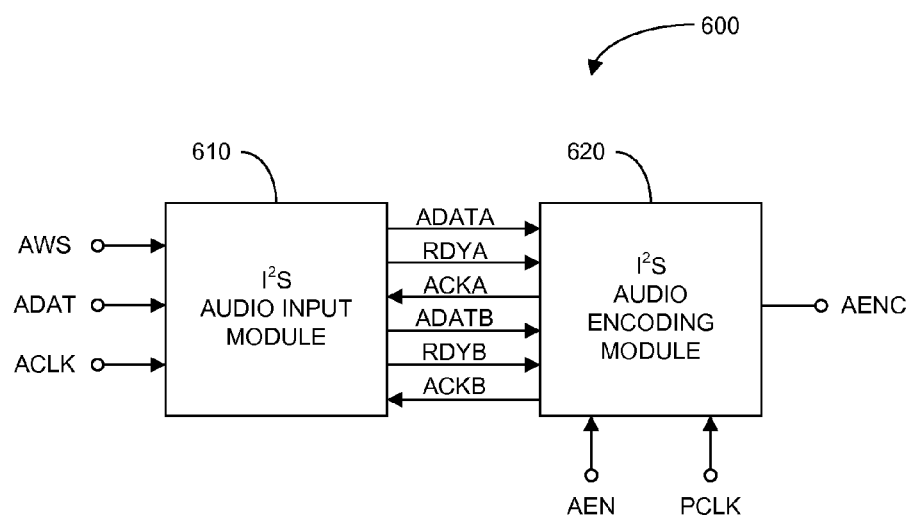
FIG. 6A illustrates a block diagram of an exemplary audio data encoder in accordance with another embodiment of the invention.

FIG. 6A illustrates a block diagram of an exemplary audio data encoder 600 in accordance with another embodiment of the invention. The audio data encoder 600 may be a more detailed implementation of the audio data encoder 426 previously discussed. And, more particularly, the audio data encoder 600 may be configured to encode audio data that is in the $I^2S$ protocol. In more detail, the audio data encoder 600 comprises an $I^2S$ audio input module 610 and an $I^2S$ audio encoding module 620. The $I^2S$ audio input module 610 receives the $I^2S$ format signals, including the audio word select AWS and audio data ADAT, at a rate dictated by the audio bit clock ACLK. The $I^2S$ audio input module 610 is adapted to produce the audio data ADAT and word select AWS at the outputs ADATA and ADATB in the form of the last two received audio words concatenated with the word select AWS. The $I^2S$ audio input module 610 is further adapted to produce the RDYA and RDYB signals to indicate that the data is ready for reading by the $I^2S$ audio encoding module 620. The $I^2S$ audio input module 610 is adapted to receive signals ACKA and ACKB indicating that the $I^2S$ audio encoding module 620 has read the data from outputs ADATA and ADATB. The data outputs are read by the $I^2S$ audio encoding module 620 based on a rate of the pixel or video clock PCLK. Thus, modules 610 and 620 operate the convert the audio data from the audio clock ACLK domain to the video clock PCLK domain.

The $I^2S$ audio encoding module 620 is adapted to generate the encoded audio data frame AENC. The $I^2S$ audio encoding module 620 receives an enable signal AEN, which selectively enables and disables the encoding operation. Additionally, the $I^2S$ audio encoding module 620 receives the video clock PCLK, which is used to output the encoded audio data frame at the rate dictated by the video clock PCLK. In generating the audio data frame, the $I^2S$ audio encoding module 620 is adapted to generate a frame separation code (e.g., N consecutive logic zeros), generate the frame start code (e.g., a single-bit logic one), form the audio data payload (ADAT and AWS) and encode it as necessary to prevent the occurrence of the frame separation code in the frame data payload, and generate the frame end code (e.g., a single-bit logic one). The following describes an example of the encoding method.

Figure 6B:
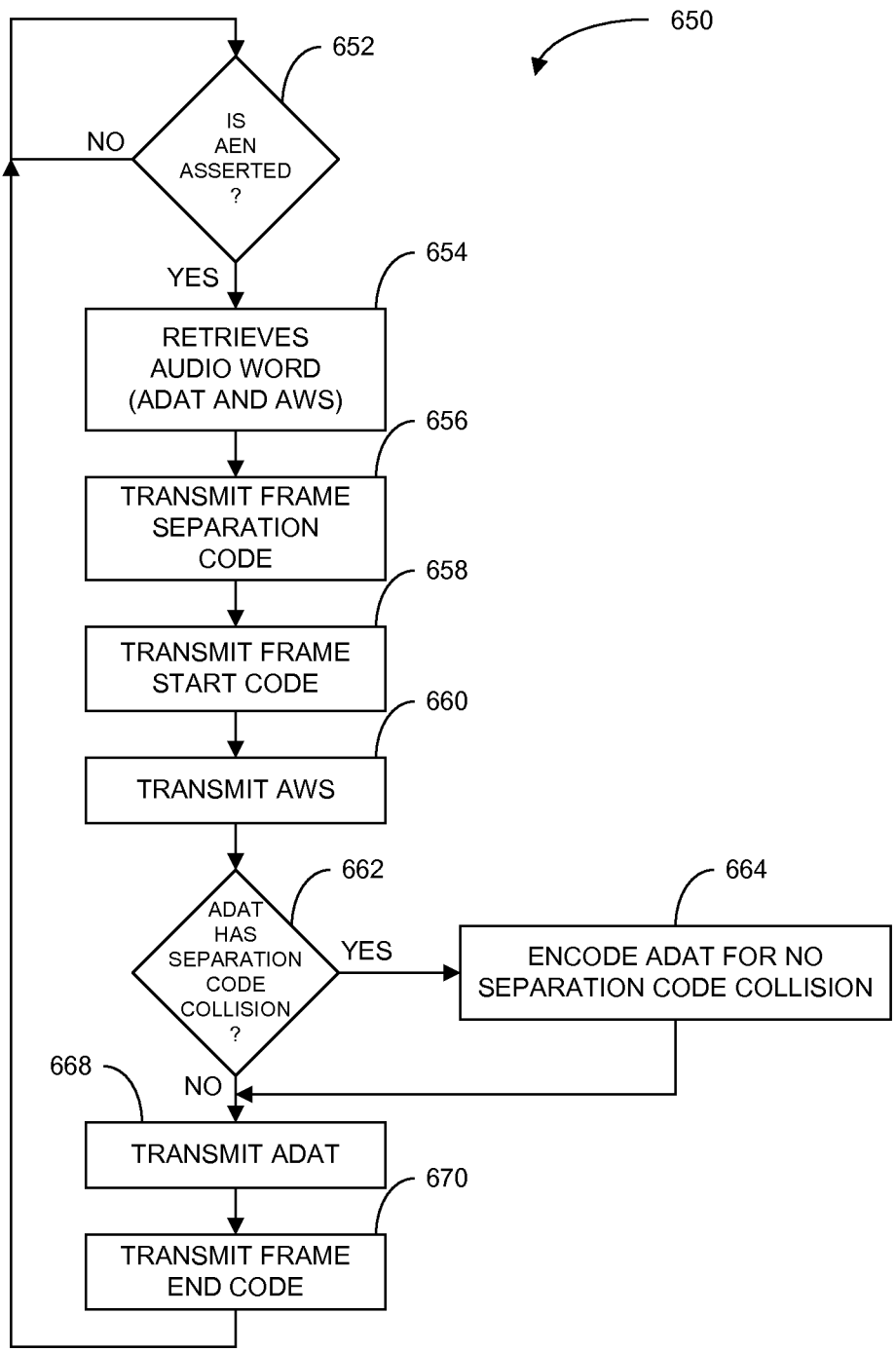
FIG. 6B illustrates a flow diagram of an exemplary method of encoding audio data in accordance with another embodiment of the invention.

FIG. 6B illustrates a flow diagram of an exemplary method 650 of encoding audio data to generate an audio data frame in accordance with another embodiment of the invention. According to the method 650, the $I^2S$ audio encoding module 620 determines whether the audio enable signal AEN is asserted (block 652). If the audio enable signal AEN is not asserted, the $I^2S$ audio encoding module 620 continues checking this signal per block 652. If, on the other hand, the audio enable signal AEN is asserted, the $I^2S$ audio encoding module 620 retrieves the audio word (ADAT and AWS) at a rate dictated by the video clock PCLK (block 654). The $I^2S$ audio encoding module 620 then serially transmits the frame separation code at a rate dictated by the video clock PCLK (block 656). Then, the $I^2S$ audio encoding module 620 transmits the frame start code at a rate dictated by the video clock PCLK (block 658).

The $I^2S$ audio encoding module 620 then transmits the audio word select (AWS) (block 660). The $I^2S$ audio encoding module 620 then analyzes the audio data ADAT to determine whether the frame separation code is present in the data (block 662). If it is, the $I^2S$ audio encoding module 620 encodes the audio data ADAT so that the frame separation code does not appear in the audio data ADAT (block 664), then proceeds to block 668 to transmit the encoded ADAT. If, on the other hand, the $I^2S$ audio encoding module 620 determines in block 662 that the frame separation code is not present in the audio data ADAT, then the encoding module 620 transmits the ADAT (block 668). Then, $I^2S$ audio encoding module 620 transmits the frame end code (block 670). The $I^2S$ audio encoding module 620 returns back to block 652 to repeat the process for encoding the next audio data frame.

Figure 7A:
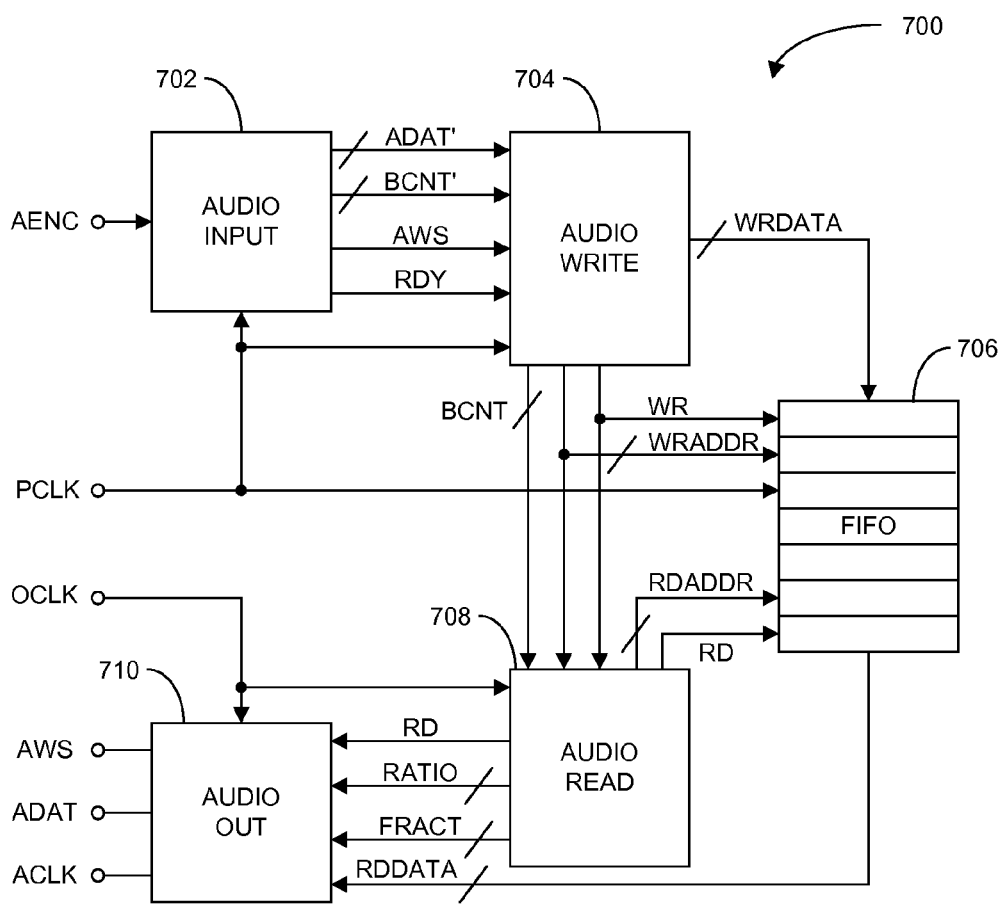
FIG. 7A illustrates a block diagram of an exemplary audio data decoder in accordance with another embodiment of the invention.

FIG. 7A illustrates a block diagram of an exemplary audio decoder 700 in accordance with another embodiment of the invention. In summary, the audio decoder 700 is adapted to receive the encoded audio data frame AENC at the video data rate PCLK, decode the data to extract the audio data word ADAT' and the audio word select AWS', recover or generate the audio data clock ACLK using a reference clock signal OCLK that has a frequency substantially greater than the frequency the audio clock, transfer the audio data word ADAT' and audio word select AWS' from the video clock PCLK domain (primed) to the audio clock ACLK domain (unprimed), and output the audio signals AWS, ADAT, and ACLK.

In particular, the audio decoder 700 comprises an audio input module 702, an audio write module 704, a first-in-first-out (FIFO) memory module 706, an audio read module 708, and an audio out module 710. The audio input module 702 performs the following: (1) receives the encoded audio data frame AENC at a rate dictated by the video clock PCLK; (2) decodes the encoded data by detecting the frame separation code, frame start code, and frame end code, and extracting the remaining data as audio data word ADAT' and audio word select AWS'; (3) determines the bit count BCNT of the audio data word ADAT' and audio word select AWS'; and (4) asserts the ready RDY signal when the audio data word ADAT', bit count BCNT, and audio word select AWS' are ready to be accessed by the audio write module 704.

In response to the decoded data being ready for access as indicated by the RDY signal, the audio write module 704 reads the audio data word ADAT', bit count BCNT, and audio word select AWS' from the audio input module 702, and writes the audio data word ADAT' and audio word select AWS' via the WRDATA output to the FIFO 706 using the write enable signal WR and the corresponding FIFO address WRADDR. The data is written into the FIFO 706 at a rate based on the video clock rate PCLK.

The audio read module 708 receives the write address WRADDR, word bit count BCNT, and write enable WR from the audio write module 704, and the clock signal OCLK from a reference oscillator. The audio read module 708 uses the write address WRADDR to keep track of the corresponding data stored in the FIFO 706, and read out the corresponding data using the read address RDADDR and read enable RD at the appropriate time. The audio read module 708 uses the write enable WR, word bit count BCNT, and the clock signal OCLK to derive parameters RATIO and FRACT from which the audio out module 710 is able to generate the audio clock ACLK, as explained in more detail below. In summary, the write enable WR signal is used to determine a running average rate in terms of clock OCLK periods in which data words are written into the FIFO 706. This running average rate may be modified based on the potential data overflow or underflow condition of the FIFO 706. The modified or unmodified running average rate is then divided by the word bit count BCNT to generate the quotient RATIO and fraction FRACT.

In response to the read enable RD, the audio out module 710 receives the corresponding audio data ADAT and audio word select AWS from the FIFO 706. Additionally, the audio out module 710 also generates and/or modifies the audio clock ACLK based on the parameters RATIO and FRACT received from the audio read module 708 and the clock signal OCLK received from the reference oscillator. The audio out module 710 further outputs the I²S audio signals AWS, ADAT, and ACLK.

Figure 7B:
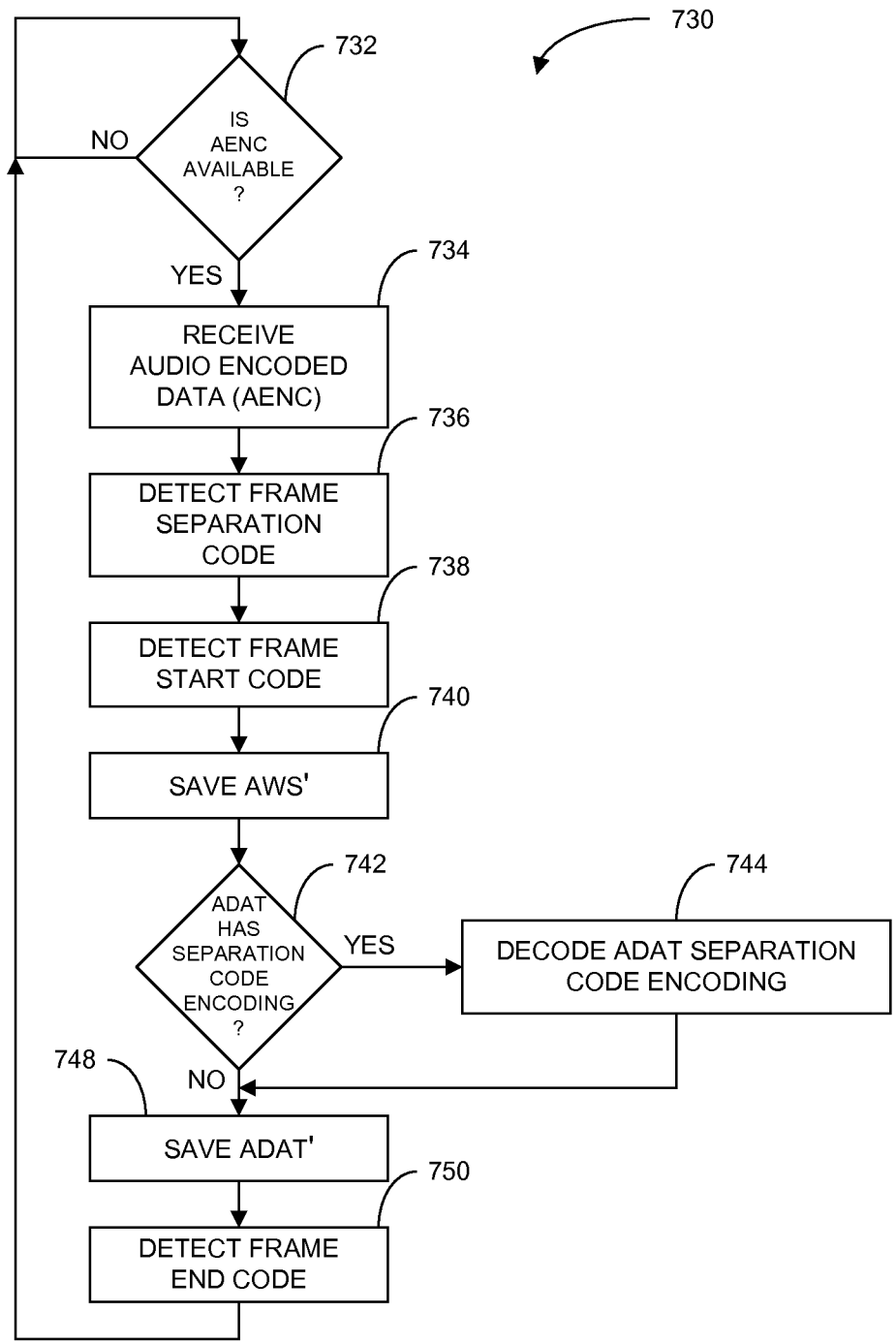
FIG. 7B illustrates a flow diagram of an exemplary method of decoding audio data in accordance with another embodiment of the invention.

FIG. 7B illustrates a flow diagram of an exemplary method 730 of decoding audio data in accordance with another embodiment of the invention. The method 730 may be implemented by the audio input module 702 of the audio decoder 700. According to the method 730, the audio input 702 determines whether the audio data frame AENC is available (block 732). If the audio data frame AENC is not available, the audio input module 702 continues to monitor whether the audio data frame AENC is available per block 732. If the audio data frame AENC is available, the audio input module 702 receives the audio encoded data frame AENC (block 734). The audio input module 702 then detects the frame separation code (block 736). The audio input module 702 also detects the frame start code (block 738).

Once it has detected these codes, the audio input module 702 is able to extract the audio data from the frame based on the defined frame structure previously described. In particular, the audio input module 702 saves the audio word select AWS' (block 740). The audio input module 702 also identifies the audio data word ADAT', and determines whether it has been encoded for separation code collision purposes (block 742). If it has, the audio input module 702 decodes the encoded audio data word (block 744). The audio input module 702 then saves the audio data word ADAT' (block 748). And, the audio input module 702 detects the frame end code 750 to complete decoding of the audio data frame AENC. The audio input module 702 performs the same operation for the next received audio data frame AENC.

Figure 7C:
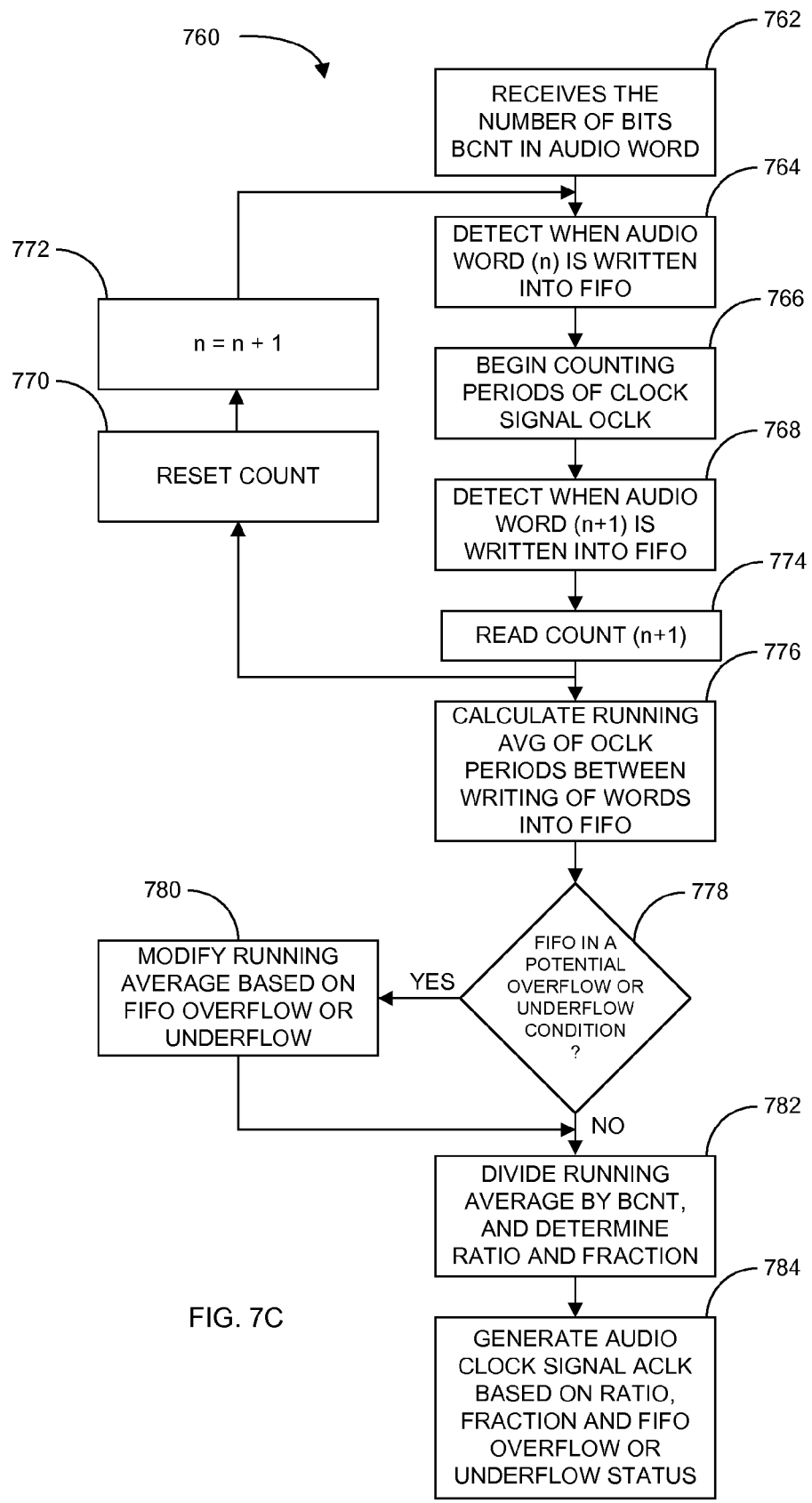
FIG. 7C illustrates a flow diagram of an exemplary method of generating or recovering an audio clock in accordance with another embodiment of the invention.

FIG. 7C illustrates a flow diagram of an exemplary method 760 of recovering or generating an audio clock signal ACLK in accordance with another embodiment of the invention. The method 760 may be mostly implemented by the audio read module 708 and partially by the audio out module 710, as discussed below. In summary, according to the method 760, the running average rate in which audio data words are written into the FIFO 706 is determined in terms of periods of the clock signal OCLK. Additionally, the potential overflow or underflow status of the FIFO 706 is determined. The running average rate may then be modified based on the potential overflow or underflow status of the FIFO 706. Then, the modified or unmodified running average rate is then divided by the number of bits BCNT in the audio words stored in the FIFO 706 to generate the quotient RATIO and fraction FRACT. Using these parameters, the audio clock ACLK is generated by dividing the frequency of the reference clock signal OCLK sometimes by the RATIO and other times by RATIO+1 so that the average frequency of the audio clock ACLK is the frequency of the reference clock OCLK divided by RATIO.FRACT.

According to the method 760, the audio read module 708 receives the BCNT from the audio write module 704, which indicates the total number of bits in the audio data word ADAT' and audio word select AWS' (block 762). By monitoring the write enable WR from the audio write module 704, the audio read module 708 detects when audio word (n) is written into the FIFO 706 (block 764). In response to detecting the audio word (n) written into the FIFO 706, the audio read module 708 begins counting periods of the reference clock signal OCLK (block 766). Then, by continually monitoring the write enable WR, the audio read module 708 detects that the next audio word (n+1) is written into the FIFO 706 (block 768). In response, the audio read module 708 reads the COUNT(n+1) (block 774). The COUNT(n+1) is related to the rate in which data words are written into the FIFO 706.

The audio read module 708 calculates the running average AVG_COUNT(n+1) of OCLK clock periods between writing of consecutive audio words into the FIFO 706 (block 776). As an example, the audio read module 708 may calculate the running average based on the following equation:

$$AVG\_COUNT(n+1)=(k-1/k)AVG\_COUNT(n)+(1/k)COUNT(n+1)$$

where k is the number of COUNT values used in determining the running average AVG_COUNT(n+1), and AVG_COUNT (n) is the resulting running average of the previous cycle n. It shall be understood that other averaging techniques may be used. The audio read module 708 also determines whether there is a potential data overflow or underflow condition of the FIFO 706 (block 778). If it determines that no potential overflow or underflow condition exists, the method 760 proceeds to block 782. If, on the other hand, it determines that a potential data overflow or underflow of the FIFO 706 exists, then the audio read module 708 modifies the running average AVG_COUNT(n+1) so as to reduce the risk of the occurrence of a FIFO overflow or underflow condition (block 780). For example, if the FIFO 706 is more than a defined percentage full (e.g., 80%) (a potential overflow condition), then the audio read module 708 may increase the running average AVG_COUNT(n+1) so that data is read out at a faster rate. Conversely, if the FIFO 706 is less than a defined percentage full (e.g., 20%) (a potential underflow condition), then the audio read module 708 may decrease the running average AVG_COUNT(n+1) so that data is read out at a slower rate.

The audio read module 708 then divides the running average AVG_COUNT(n+1) by the audio data bit count BCNT, and determines the quotient RATIO and fraction FRACT (block 782). The audio read module 708 then sends the parameters RATIO and FRACT to the audio out module 710, which generates the audio clock ACLK from these parameters and the reference clock signal OCLK (block 784). More specifically, the audio out module 710 divides the frequency of the reference clock signal OCLK by RATIO some of the times, and by RATIO+1 the other times, in order to achieve an average audio clock rate substantially equal to frequency of the reference oscillator OCLK divided by RATIO.FRACT. As an example, if FRACT is equal to 0.5, then the audio out module 710 divides the frequency of the clock signal OCLK by RATIO half of the times, and by RATIO+1 half of the times. As another example, if FRACT is equal to 0.75, then the audio out module 710 divides the frequency of the clock signal OCLK by RATIO a quarter of the times, and by RATIO+1 three-quarters of the times.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A transmitting device for transmitting high speed and low speed data words via a serial data link, comprising:
   a first module configured to generate a low speed data frame, the low speed data frame further comprising a frame separation code, a frame start code, a frame data comprising a low speed data word with separation code collision protection encoding, and a frame end code, wherein the frame data with separation code collision protection encoding prevents the frame separation code from appearing in the frame data; and
   a second module configured to:
   generate a high speed data frame comprising at least a portion of high speed data word and a portion of the low speed data frame; and
   serially transmit the high speed data frame via the serial data link,
   wherein the transmitting device comprises one or more processors and one or more memories.

2. The transmitting device of claim 1, wherein the high speed data frame comprises an entire high speed data word.

3. The transmitting device of claim 2, wherein the high speed data frame comprises a single bit of the low speed data frame.

4. The transmitting device of claim 3, wherein the high speed data word comprises a video data word, and the low speed data frame comprises an audio data word.

5. The transmitting device of claim 4, wherein the low speed data frame further comprises a stereo-channel select for corresponding audio data word.

6. The transmitting device of claim 5, wherein the audio data word and stereo-channel select are compliant with I2S protocol.

7. The transmitting device of claim 1, further comprising a low speed data serializer configured to receive the low speed data word in parallel format at a low speed data rate and convert the low speed data word into serial format.

8. The transmitting device of claim 7, wherein the first module is configured to generate the low speed data frame at a high speed data rate from serialized low speed data word at the low speed data rate.

9. The transmitting device of claim 8, wherein the second module comprises a high speed data serializer configured to:
   receive the high speed data word in parallel format at the high speed data rate;
   receive the portion of the low speed data frame from the first module at the high speed data rate;
   time multiplex the high speed data word with the portion of the low speed data frame to generate the high speed data frame; and
   serially transmit the high speed data frame via the serial data link at the high speed data rate.

10. The transmitting device as in claim 1 wherein the separation code collision protection encoding analyzes the low speed data word to determine if there are any one or more frame separation codes in the low-speed data word, and if there are any one or more frame separation codes in the low speed data word, the separation code collision protection encoding encodes the low speed data word to prevent appearance of the frame separation code therein.

11. The transmitting device of claim 10 wherein to prevent a frame separation code collision, the separation code collision protection encoding stuffs the frame data with separation code collision protection encoding with an extra logic one bit.

12. A receiving device for processing a plurality of high speed data frames received via a serial data link, comprising:
   a first module configured to:
   serially receive the high speed data frames via the serial data link; and
   form a high speed data word from one or more high speed data frames; and
   output portions of low speed data frames from respective high speed data frames; and
   a second module configured to form a low speed data frame from the respective portions of the high speed data frames, wherein the low speed data frame comprises a frame separation code, a frame start code, a frame data comprising a low speed data word with separation code collision protection encoding, and a frame end code, wherein the frame data with separation code collision protection encoding prevents the frame separation code from appearing in the frame data
   wherein the receiving device comprises one or more processors and one or more memories.

13. The receiving device of claim 12, wherein the portions of the low speed data frames each comprises a signal bit of the low speed data frame.

14. The receiving device of claim 13, wherein the high speed data word comprises a video data word, and the low speed data frame comprises an audio data word.

15. The receiving device of claim 14, wherein the low speed data frame comprises a stereo-channel select associated with the audio data word.

16. The receiving device of claim 15, wherein the second module is configured to generate an audio clock signal based on a rate in which audio data words are received.

17. The receiving device of claim 16, wherein the audio data word, stereo-channel select, and audio clock signal are compliant with I2S protocol.

18. The receiving device of claim 16, further comprising a memory for temporarily storing the audio data words, wherein the audio clock signal is further based on a potential overflow or underflow condition of the memory.

19. The receiving device of claim 12, wherein the second module is configured to decode the low speed data word such that one or more instances of the frame separation code appears in decoded low speed data word.

20. The receiving device of claim 12, wherein the first module comprises a high speed deserializer configured to convert high speed data frame in serial format to a parallel format.

21. The receiving device of claim 20, wherein the second module is configured to convert the low speed data word received in serial format from the first module into a parallel format.

22. The receiving device of claim 12, wherein the second module is configured to convert the low speed data frame in a high speed clock domain to a low speed clock domain.

23. The receiving device of claim 12, wherein the second module is configured to generate a clock signal based on a rate in which low speed data words are received.

24. A data communication system, comprising:
   a transmitting device for transmitting high speed and low speed data words via a serial data link, comprising:
   a first module configured to generate a low speed data frame, the low speed data frame further comprising a frame separation code, a frame start code, a frame data comprising a low speed data word with separation code collision protection encoding, and a frame end code, wherein the frame data with separation code collision protection encoding prevents the frame separation code from appearing in the frame data; and
a second module configured to:
generate a plurality of high speed data frames each comprising at least a portion of high speed data word and a portion of the low speed data frame; and
transmit the high speed data frames via the serial data link; and
a receiving device for processing the high speed data frames received via the serial data link, comprising:
a first module configured to form the high speed data word from one or more of the high speed data frames; and
a second module configured to form the low speed data frame from respective portions of the high speed data frames,
wherein the transmitting device comprises one or more processors and one or more memories.

\* \* \* \* \*